(12) United States Patent
Kurani

(10) Patent No.: US 11,847,621 B2
(45) Date of Patent: Dec. 19, 2023

(54) SYSTEMS AND METHODS FOR MATH-BASED CURRENCY ESCROW TRANSACTIONS

(71) Applicant: Wells Fargo Bank, N.A., San Francisco, CA (US)

(72) Inventor: Ashish B. Kurani, Hillsborough, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/963,980

(22) Filed: Oct. 11, 2022

(65) Prior Publication Data
US 2023/0034907 A1 Feb. 2, 2023

Related U.S. Application Data

(63) Continuation of application No. 16/960,582, filed on Jul. 8, 2020, now Pat. No. 11,259,270, which is a (Continued)

(51) Int. Cl.
*G06Q 20/06* (2012.01)
*G06Q 40/04* (2012.01)
(Continued)

(52) U.S. Cl.
CPC ....... *G06Q 20/0658* (2013.01); *G06Q 20/401* (2013.01); *G06Q 20/4015* (2020.05);
(Continued)

(58) Field of Classification Search
CPC ... H04W 48/12; H04W 68/005; H04W 68/02; H04W 68/04; H04W 76/27
See application file for complete search history.

(56) References Cited

U.S. PATENT DOCUMENTS

| 5,920,629 A | 7/1999 | Rosen |
| 6,029,146 A | 2/2000 | Hawkins et al. |

(Continued)

FOREIGN PATENT DOCUMENTS

| CA | 2975528 A1 | 12/2016 |
| WO | WO-2006/009716 A2 | 1/2006 |

OTHER PUBLICATIONS

U.S. Appl. No. 14/282189, filed May 20, 2014.
(Continued)

*Primary Examiner* — Diane D Mizrahi
(74) *Attorney, Agent, or Firm* — Foley & Lardner LLP

(57) ABSTRACT

Systems and methods for verifying a digital title of an asset transferred via a math-based currency transaction. The method includes receiving a digital title request regarding an asset, creating a digital title for the asset in a digital title database, receiving, from a financial institution computing system, an asset transfer request regarding the asset that is the subject of the math-based currency transaction, verifying that an identity of a seller in the math-based currency transaction matches the identity of the owner of the asset. Then, responsive to the verification that the identity of the seller in the math-based currency transaction matches the identity of the owner of the asset, the method includes transmitting, to the financial institution computing system, a positive title verification and updating the identity of the asset of the digital title for the asset to match an identity of a buyer in the math-based currency transaction.

20 Claims, 3 Drawing Sheets

Related U.S. Application Data continuation of application No. 14/946,339, filed on Nov. 19, 2015, now Pat. No. 10,719,816.

(51) Int. Cl.

| | | |
|---|---|---|
| *G06Q 20/40* | (2012.01) | |
| *H04W 76/27* | (2018.01) | |
| *H04W 48/12* | (2009.01) | |
| *H04W 68/00* | (2009.01) | |
| *H04W 68/02* | (2009.01) | |
| *H04W 68/04* | (2009.01) | |

(52) U.S. Cl.
CPC .......... *G06Q 40/04* (2013.01); *H04W 48/12* (2013.01); *H04W 68/005* (2013.01); *H04W 68/02* (2013.01); *H04W 68/04* (2013.01); *H04W 76/27* (2018.02)

(56) References Cited

U.S. PATENT DOCUMENTS

| | | | |
|---|---|---|---|
| 6,047,067 A | 4/2000 | Rosen | |
| 6,721,715 B2 | 4/2004 | Nemzow | |
| 7,103,575 B1 | 9/2006 | Linehan | |
| 7,483,860 B2 | 1/2009 | Cronce et al. | |
| 8,086,507 B1 | 12/2011 | Alder | |
| 8,381,969 B1 | 2/2013 | Miller et al. | |
| 8,417,629 B1 | 4/2013 | Hildebrand et al. | |
| 9,022,286 B2 | 5/2015 | Wyatt | |
| 9,053,482 B2 | 6/2015 | Hill et al. | |
| RE46,319 E | 2/2017 | Milman et al. | |
| 10,719,816 B1 * | 7/2020 | Kurani | G06Q 20/3672 |
| 11,408,413 B2 * | 8/2022 | Jeon | F04B 39/121 |
| 2002/0138735 A1 | 9/2002 | Felt et al. | |
| 2002/0156718 A1 | 10/2002 | Olsen et al. | |
| 2003/0014496 A1 | 1/2003 | Spencer et al. | |
| 2003/0028481 A1 | 2/2003 | Flitcroft et al. | |
| 2004/0143523 A1 | 7/2004 | Pegaz-Paquet et al. | |
| 2004/0177035 A1 | 9/2004 | Silva | |
| 2005/0228986 A1 | 10/2005 | Fukasawa et al. | |
| 2006/0282376 A1 | 12/2006 | Goldberg et al. | |
| 2007/0124809 A1 | 5/2007 | Narin et al. | |
| 2007/0130463 A1 | 6/2007 | Law et al. | |
| 2007/0136209 A1 | 6/2007 | Khan et al. | |
| 2007/0168282 A1 | 7/2007 | Giordano | |
| 2007/0219921 A1 | 9/2007 | Lee et al. | |
| 2008/0082439 A1 | 4/2008 | Everaert et al. | |
| 2008/0120248 A1 | 5/2008 | Roehr | |
| 2008/0223918 A1 | 9/2008 | Williams et al. | |
| 2008/0270285 A1 | 10/2008 | Cartledge et al. | |
| 2009/0037913 A1 | 2/2009 | Dantzig et al. | |
| 2010/0057607 A1 | 3/2010 | Galit | |
| 2011/0078087 A1 | 3/2011 | Brown et al. | |
| 2012/0072995 A1 | 3/2012 | Crawford | |
| 2012/0101886 A1 | 4/2012 | Subramanian et al. | |
| 2012/0259716 A1 | 10/2012 | Rosenberger | |
| 2013/0104162 A1 | 4/2013 | Helms et al. | |
| 2013/0124306 A1 | 5/2013 | Hutchinson et al. | |
| 2013/0166455 A1 | 6/2013 | Feigelson | |
| 2014/0006273 A1 | 1/2014 | Gopinath et al. | |
| 2014/0032394 A1 | 1/2014 | Liberty et al. | |
| 2014/0136431 A1 | 5/2014 | Dahod et al. | |
| 2015/0120569 A1 | 4/2015 | Belshe et al. | |
| 2015/0262173 A1 | 9/2015 | Durbin et al. | |
| 2015/0310476 A1 | 10/2015 | Gadwa | |
| 2015/0324764 A1 | 11/2015 | Van Rooyen et al. | |
| 2015/0332256 A1 | 11/2015 | Minor | |
| 2016/0098723 A1 | 4/2016 | Feeney | |
| 2016/0203572 A1 | 7/2016 | McConaghy et al. | |
| 2016/0234026 A1 | 8/2016 | Wilkins et al. | |
| 2016/0300234 A1 | 10/2016 | Moss-Pultz et al. | |
| 2016/0323109 A1 | 11/2016 | McCoy et al. | |
| 2016/0330031 A1 | 11/2016 | Drego et al. | |
| 2016/0350728 A1 | 12/2016 | Melika et al. | |
| 2016/0350749 A1 | 12/2016 | Wilkins et al. | |
| 2017/0078255 A1 | 3/2017 | Nejadian et al. | |
| 2017/0109744 A1 | 4/2017 | Wilkins et al. | |
| 2017/0187535 A1 | 6/2017 | Middleton et al. | |
| 2017/0236104 A1 | 8/2017 | Biton | |

OTHER PUBLICATIONS

"Adding Metadata to the Blockchain, part 1," Digiconomist, retrieved from https://digiconomist.net/adding-metadata-blockchain-part-1, 5 pages (2015).

"Capital adequacy ratios for banks—simplified explanation and example of calculation," Reserve Bank of New Zealand, 9 pages (2007).

"Metadata in the Blockchain: The OP_RETURN Explosion," Coin Sciences Ltd, retrieved from https://www.slideshare.net/coinspark/bitcoin-2-and-opreturns-the-blockchain-as-tcpip, 31 pages (2014).

"What are Coloured Coins and Meta Coins?," CryptoCompare, retrieved from https://www.cryptocompare.com/coins/guides/what-are-coloured-coins-and-meta-coins/, 6 pages (2015).

Bitcoin Directory, Bitcoin Exchange Directory, as available online on Aug. 13, 2011 at http://www.bitcoindir.com/exchange, retrieved from the Internet archives on Oct. 9, 2015, 1 page as printed.

Bower, B. (Aug. 8, 2019). How an ancient stone money system works like cryptocurrency. Retrieved Jul. 27, 2020, from https://www.sciencenews.org/article/yap-stone-money-bitcoin-blockchain-cryptocurrency (Year: 2019).

Crypto Compare: What are Colored Coins and Meta Coins? Feb. 12, 2015, pp. 1-6. (Year: 2015).

Fitzpatrick et al., "Banking on Stone Money: Ancient Antecedents to Bitcoin", Jun. 2019, American Anthropological Association, Economic Anthropology Jun. 2019, p. 1-4, 8-10 (Year: 2019).

Free Software Foundation (The GNU Privacy Handbook, Chapter 3. Key Management, http://web.archive.org/web/20060615000000*/https://www.gnupg.org/gph/en/manual/x457.html, Jun. 18, 2006) (Year: 2006).

Free Software Foundation(The GNU Privacy Handbook, Chapter 3, Key Management. http://web.archive.org/web/20060615000000*/https://www.gnupg.org/gph/en/manual/z457.html, Jun. 18, 2006). 1 page.

Jain, R.: Tokenization: The Future of Payment Security? Jul. 22, 2014, pp. 1-10 (Year: 2014).

Menezes, A. J., Oorschot, P. C., & Vanstone, S. A. (1997). Handbook of Applied Cryptography. Doi: 10.1201/9780429466335 (Year: 1997).

Mizrahi, "A blockchain-based property ownership recording system," ChromaWay, retrieved from https://chromaway.com/papers/A-blockchain-based-property-registry.pdf, 9 pages (2014).

Nakamoto, "Bitcoin: A Peer-to-Peer Electronic Cash System," Bitcoin, retrieved from https://bitcoin.org/bitcoin.pdf, 9 pages (2008).

Nakamoto, Satoshi: Bitcoin: A peer-to-peer Electronic Cash System, Oct. 31, 2008, pp. 1-6 (Year: 2008).

Pandya, D., Ram K. Thakkar, S., Madhekar. T., & Thakare, B. (2015). Brief History of Encryption, International Journal of Computer Applications, 131 (9), 28-31. Doi: 10.5120/ijca2015907390 (Year: 2015).

Peters et al., Understanding Modem Banking Ledgers through Blockchain Technologies: Future of Transaction Processing and Smart Contracts on the Internet of Money, Nov. 19, 2015, pp. 1-33.

The Free Software Foundation, The GNU Privacy Handbook, Chapter 3, Key Management, http://web.archive.org/web/20060615000000*/https://www.gnupg.org/gph/en/manual/x457.html, Jun. 18, 2006, 1 page.

Webopedia, Public Key Encryption definition, as available on Mar. 18, 2008 at http://www.webopedia.com/TERM/P/public_key_cryptograph.html, retrieved from the Internet archives on Oct. 9, 2015, 3 pages as printed.

Seward, Real money starts to pour into math-based currencies like bitcoin (Year: 2013).

\* cited by examiner

SYSTEMS AND METHODS FOR MATH-BASED CURRENCY ESCROW TRANSACTIONS

CROSS-REFERENCE TO RELATED APPLICATIONS

This application is a continuation of U.S. patent application Ser. No. 16/930,582, titled "Systems And Methods For Math-Based Currency Escrow Transactions," filed on Jul. 16, 2020, which is a continuation of U.S. patent application Ser. No. 14/946,339, titled "Systems And Methods For Math-Based Currency Escrow Transactions," filed on Nov. 19, 2015, which is related to: (1) U.S. patent application Ser. No. 14/282,200 filed May 20, 2014, now U.S. Pat. No. 11,062,278, titled "Systems and Methods for Math-Based Currency Credit Transactions," (2) U.S. patent application Ser. No. 14/282,202 filed May 20, 2014, now U.S. Pat. No. 10,909,509 issued Feb. 2, 2021, titled "Infrastructure for Maintaining Math-Based Currency Accounts," and (3) U.S. patent application Ser. No. 14/282,189 filed May 20, 2014, now U.S. Pat. No. 10,970,684 issued Apr. 6, 2021, titled "Systems and Methods for Maintaining Deposits of Math-Based Currency," all of which are incorporated herein by reference in their entireties and for all purposes.

TECHNICAL FIELD

Embodiments of the present invention relate generally to escrow systems and methods for transactions involving math-based currency.

BACKGROUND

Math-based currency ("MBC"), often referred to as cryptocurrency, is rising in popularity, use, and public acceptance. MBC differs from fiat currency (i.e., currency that is declared by a government to be a legal tender) in that principles of cryptography are used to create, secure, and transfer MBC directly from a first user to a second user instead of passing a fiat currency. A user of MBC can transfer funds to another party by using a private key associated with a certain value of MBC. The private key may be used to generate a signature for the transaction, and the signature can be verified by verification nodes in the MBC network, thereby completing the transaction. Additional information, including the identities of the parties involved in the exchange, is not required to effectuate the transaction. Accordingly, MBC allows for anonymous transfers of currency between users without the reliance on financial institutions (e.g., a bank) to facilitate the transfer. Examples of MBCs include Bitcoin, Ripple, Litecoin, Peercoin, and Dogecoin, among others.

As the popularity of MBC gains, more and more individuals are utilizing MBC in everyday transactions. For example, many individuals are utilizing MBC to pay for goods and services in everyday transactions. However, certain transactions still require the physical exchange of items. For example, in certain transactions involving the transfer of titled items, funds may be held in escrow until a title is physically transferred between parties. Parties involved in such escrow transactions may prefer traditional currencies instead of MBC. Systems and methods that provide for improved MBC escrow transactions are desired.

SUMMARY

A first example embodiment relates to a method of facilitating the transfer of an asset from a seller to a buyer through a transfer of a digital title via a math-based currency transaction. The method includes receiving, by a financial institution computing system associated with a financial institution, an amount of funds from the buyer. The method further includes receiving, by the financial institution computing system, an identifier of the math-based currency transaction from a seller computing device associated with the seller. The math-based currency transaction is for a transfer of a first amount of a math-based currency from the seller to the buyer. The method includes locating, by the financial institution computing system, a record of the first math-based currency transaction in a distributed ledger associated with the math-based currency. The method further includes verifying, by the financial institution computing system, that the record of the first math-based currency transaction includes an indication that the digital title was passed from the seller to the buyer. The method includes sending, by the financial institution computing system, the amount of funds to the seller.

Another example embodiment relates to a financial institution computing system associated with a financial institution. The system includes a network interface configured to communicate with customer devices associated with customers via a network. The system further includes an account database storing information relating to a plurality of financial accounts maintained by the financial institution. The system includes a memory and at least one processor. The at least one processor is configured to receive, from either a buyer device associated with a buyer or a seller device associated with a seller, an indication that the seller agreed to transfer ownership of an asset to a buyer through a transfer of digital title via a math-based currency transaction. The at least one processor is further configured to receive an amount of funds from the buyer, and to receive an identifier of the math-based currency transaction from the seller device. The math-based currency transaction is for a transfer of a first amount of a math-based currency from the seller to the buyer. The at least one processor is configured to locate a record of the first math-based currency transaction in a distributed ledger associated with the math-based currency. The at least one processor is further configured to verify that the record of the first math-based currency transaction includes an indication that the digital title was passed from the seller to the buyer. The at least one processor is configured to send the amount of funds to the seller.

These and other features, together with the organization and manner of operation thereof, will become apparent from the following detailed description when taken in conjunction with the accompanying drawings.

DETAILED DESCRIPTION

Referring to the figures generally, systems and methods for performing transactions involving a purchase of a titled item with MBC held in escrow are described. Often, when a seller and buyer enter into a purchase agreement for a titled asset, the seller and buyer complete the transaction via an escrow agent that holds funds until title for the asset has passed from the seller to the buyer. After verification of the passage of title from the seller to the buyer, the escrow agent releases the funds to the seller. The below described systems and methods facilitate the sale of an asset having digital title through two separate MBC transactions. The first MBC transaction passes digital title from the seller to the buyer by incorporating the digital title or a pointer to the digital title in the metadata of the first MBC transaction. The second MBC transaction passes funds to the seller from the buyer (either directly or via an intermediary). Accordingly, the ownership chain of the asset can be traced and verified through a MBC blockchain or ledger that serves as a record of all MBC transactions.

Figure 1:
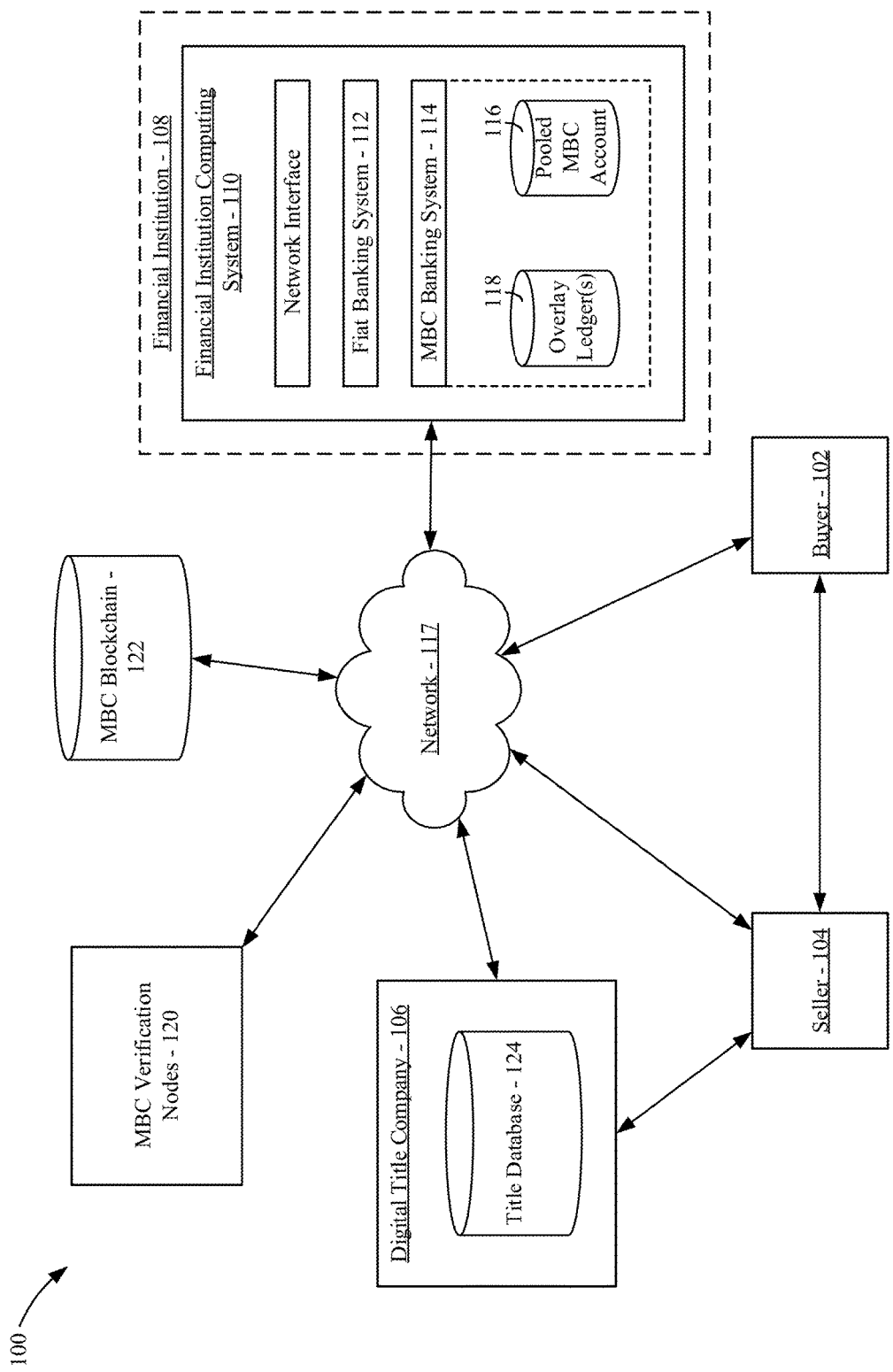
FIG. 1 is a diagram of a computing system according to an example embodiment.

Referring to FIG. 1, a diagram of a computing system 100 is shown according to an example embodiment. As described in further detail below, the computing system 100 facilitates a transaction between a buyer 102 and a seller 104. The transaction involves the purchase of an asset owned by the seller 104 by the buyer 102. The item is a physical or digital item having a digital title maintained by a digital title company 106. A digital title is a digital file associated with an asset (physical or digital) that proves ownership of the asset. To effect the transfer of the digital title from the seller 104 to the buyer 102, the digital title or a pointer to the digital title is embedded into a MBC transfer from the seller 104 to the buyer 102. For example, the seller 104 may initiate a MBC transfer to the buyer 104 for a nominal amount of Bitcoin, Litecoin, Ripple, or the like and embed the digital title or a pointer to the digital title in a metadata field of the MBC transfer. In some arrangements, the buyer 102 pays the seller 104 with an amount of MBC in a second MBC transfer from the buyer 102 to the seller 104. In an alternative arrangement, the buyer 102 pays the seller 104 in fiat currency (e.g., with a check, with a wire, with cash, etc.).

The computing system 100 includes a financial institution 108. The financial institution 108 includes a financial institution computing system 110. The financial institution 108 offers banking services to customers (e.g., any of the seller 104, the buyer 102, and other customers). The financial institution 108 offers traditional fiat currency banking services through a fiat banking system 112 within the financial institution computing system 110. Fiat currency is money that is declared by a government to be legal tender (e.g., US Dollars, Canadian Dollars, Chinese Yuan, Euros, Japanese Yen, etc.). The fiat banking services may include demand deposit accounts, credit services, loan services, investment services, and the like. Additionally, the financial institution 108 also offers MBC services through a MBC banking system 114 within the financial institution computing system 110. For example, a customer may have a fiat currency deposit account, such as a savings account or a checking account in US Dollars. Additionally or alternatively, customers may have MBC accounts with the financial institution 102. In providing the fiat banking services and the MBC banking services to its customers, the financial institution computing system 110 communicates with various external systems (e.g., computing devices associated with its customers, etc.) via a network 117 (e.g., the Internet).

In some arrangements, MCB associated with the MBC banking system 114 (e.g., MBC deposited by banking customers) is held by the financial institution 108, and the MBC is properly secured within the financial institution 108 in order to avoid double spending of the MBC by the customer. In one example embodiment, the customer transfers various information for the MBC (including the private keys) and the financial institution 108 executes an internal transfer of the MBC to a new private key/public key pair which are then stored in a database. In another example embodiment, the customers initiate a transaction to the financial institution 108 and the new private/public key pair which are created as a result of the performance of the transaction are stored in the database. The financial institution 108 includes a pooled MBC account 116 (i.e., a database of private key/public key pairs). The MBC stored in the pooled MBC account 116 may be significantly less than the total amount of MBC received in the form of deposits and may not be associated with any particular customer. The financial institution computing system 110 further includes at least one overlay ledger 118 that tracks the amount of MBC that is associated with each of the customers. Thus, the financial institution 108 does not need to separate each of the customers' MBC into separate addresses or maintain a complete balance of MBC in the pooled MBC account 116.

The pooled MBC account 116 is used by the financial instruction 108 to take possession of MBC deposited by customers. The pooled MBC account 116 is a database of addresses, private keys, and public keys associated with MBC that has been transferred to the financial institution 108. The financial institution 108 maintains the contents of the pooled MBC account 116 in secrecy such that entities and people outside of the financial institution 108 do not have knowledge of the addresses, private keys, and public keys associated with the MBC transferred to the financial institution 108. Through the pooled MBC account 116, the financial institution 108 maintains the MBC from customers received during deposit transactions and initiates transfers of MBC to customers during withdrawal transactions. In some arrangements, the financial institution 108 may maintain a plurality of pooled MBC accounts (i.e., a plurality of separate databases) containing MBC of a plurality of customers. The plurality of pooled MBC accounts may be limited to pooling up to a certain number of customers 104 MBC, a certain amount of MBC, and/or may be divided by types of accounts (e.g., credit account, savings account, checking account, etc.). In further arrangements, the financial institution 108 maintains individual MBC accounts for each customer.

The overlay ledger 118 provides a record of association for the MBC within the pooled MBC account 116. The overlay ledger 118 associates an individual customer with a designated amount of MBC transferred to the financial institution 108. The overlay ledger 118 may be stored in a database. Each account for customers may be associated with a single entry in the database. The same or additional ledgering systems may be used to track transactions (e.g., credit and debit transactions) for each the specific MBC accounts. The financial institution 108 updates the overlay ledger 118 after each MBC transfer into and out of the pooled MBC account 116. In certain situations, the financial institution 108 may update the overlay ledger 118 without a transfer of MBC into or out of the pooled MBC account 116. For example, if a first customer wants to transfer a designated amount of MBC to a second customer, and both customers are account holders with the financial institution 108, the transfer may be effectuated by updating the overlay ledger 118 without an actual transfer of MBC in the pooled MBC account 116. Further details of how the financial institution 108 uses the overlay ledger 118 to maintain records of account balances and transactions are described in U.S. patent application Ser. No. 14/282,189, entitled "SYSTEMS AND METHODS FOR MAINTAINING DEPOSITS OF MATH-BASED CURRENCY," by Kurani, and filed on May 20, 2014, and U.S. patent application Ser. No. 14/282, 202, entitled "INFRASTRUCTURE FOR MAINTAINING MATH-BASED CURRENCY ACCOUNTS," by Kurani, and filed on May 20, 2014, both of which are hereby incorporated by reference in their entireties and for all purposes.

Still referring to FIG. 1, the system 100 includes MBC verification nodes 120 and the MBC blockchain 122. The MBC nodes 120 verify all MBC transactions and maintain a distributed ledger (i.e., the MBC blockchain 122) of all the verified MBC transactions. The MBC nodes 120 may verify transactions involving the financial institution 108 in addition to MBC transactions not involving the financial institution 108. The MBC nodes 120 verify MBC transactions by verifying information relating to the transaction, such as by verifying the signatures of the MBC transactions and by verifying that there has not been double-spending of the MBC involved in the transaction. The verification information is published in the MBC blockchain 122, which is later used for further verifications of additional transactions.

For purposes of clarity, an example MBC transaction between a payer and a payee is described. To begin the MBC transaction, the payer selects his account via a MBC wallet client, selects an amount of MBC to send to the payee, and inputs a MBC address associated with the payee. In some arrangements, the MBC wallet client is affiliated with the financial institution 108. In other arrangements, the MBC wallet client is an independent wallet that maintains a record of the addresses associated with MBC held by the payer. The payer can input the payee's MBC address into the MBC wallet client by manually typing the address in, by scanning a code (e.g., a QR code) provided by the payee (e.g., via a screen of a merchant POS terminal if the payee is a merchant, via e-mail, etc.), by receiving the address from the payee (e.g., via a wireless data transfer, such as Bluetooth, WiFi, or NFC), by presenting a tokenized version of the address (e.g., an e-mail address associated with the payor, a phone number associated with the payor, etc.), which is used to identify the actual address, or the like.

Once the information concerning the transaction is input into the MBC wallet client, the transaction can be confirmed by the payor. After confirmation, the MBC wallet client signs (e.g., encrypts) the transaction with a private encryption key held by the payor and broadcasts the pending transaction to MBC verification nodes 120 via the network 117 (e.g., via the Internet). In arrangements where the MBC wallet client is affiliated with the financial institution 108 and where the MBC being transferred is associated with a MBC account held by the payer with the financial institution 108, the transaction information is sent to the financial institution computing system 110 for broadcasting to the MBC verification nodes 120. In some arrangements, the MBC wallet client also sends a confirmation message to the payee indicating that that the MBC transaction is pending. The MBC verification nodes 120 verify that the payer's address has enough MBC to complete the pending transaction and that the payer has authorized the pending transaction by cryptographically verifying the encrypted transaction information. Once verified by the MBC verification nodes 120, the transaction—including any information contained in the metadata of the transaction—is recorded in a MBC blockchain 122.

Referring again to FIG. 1, the MBC blockchain 122 is a chronological and public ledger of all MBC transactions that have been executed. The MBC blockchain 122 includes a series of verified transaction blocks. Each of the blocks includes a listing of MBC transactions that occurred during the time period corresponding to the block. Each transaction in the listing of MBC transactions includes information about the transaction, including a sender identity number (e.g., the sender address), a recipient identity number (e.g., the recipient address), an amount of MBC transferred from the sender to the recipient, a date and time the transaction was broadcast by the sender, a date and time in which the transaction was verified by the MBC nodes 120, and an additional information field or metadata field that can store additional information related to the transaction. As described in further detail below, digital title for an asset can be passed between parties of a MBC transaction by placing the digital title or a pointer to the digital title in the additional information field or metadata field, such as the op_return field, the nSequence field, or another metadata field of a Bitcoin transaction.

Digital title for a given asset is maintained by the digital title company 106. The digital title may be an entry in the digital title database 124. The digital title database 124 is maintained by a computing system associated with the digital title company 106. The pointer in the metadata of a MBC transaction points to the digital title points a location in a title database 124 maintained by the digital title company 106. For example, the pointer may be a hyperlink or a digital title identification or serial number. In some arrangements, the digital title itself is embodied as a token or a cryptographic string that is verifiable by the digital title company 106. In such arrangements, the token or cryptographic string itself can be inserted into the metadata of the MBC transaction that passes title from the seller 104 to the buyer 102. The digital title company 106 generally verifies the ownership of a piece of property (e.g., a parcel of land, a car, a painting, a piece of furniture, etc.). For the piece of property, ownership is verified based on the chain of title and the names on the title. Each piece of property has a unique identifier (e.g., an address, a vehicle identification number, a serial number, a number assigned by the digital title company 106, etc.). Based on the unique identifier, any individual or entity with permission to access the title database 124 can verify up-to-date ownership information concerning the piece of property identified by the unique identifier.

Figure 2:
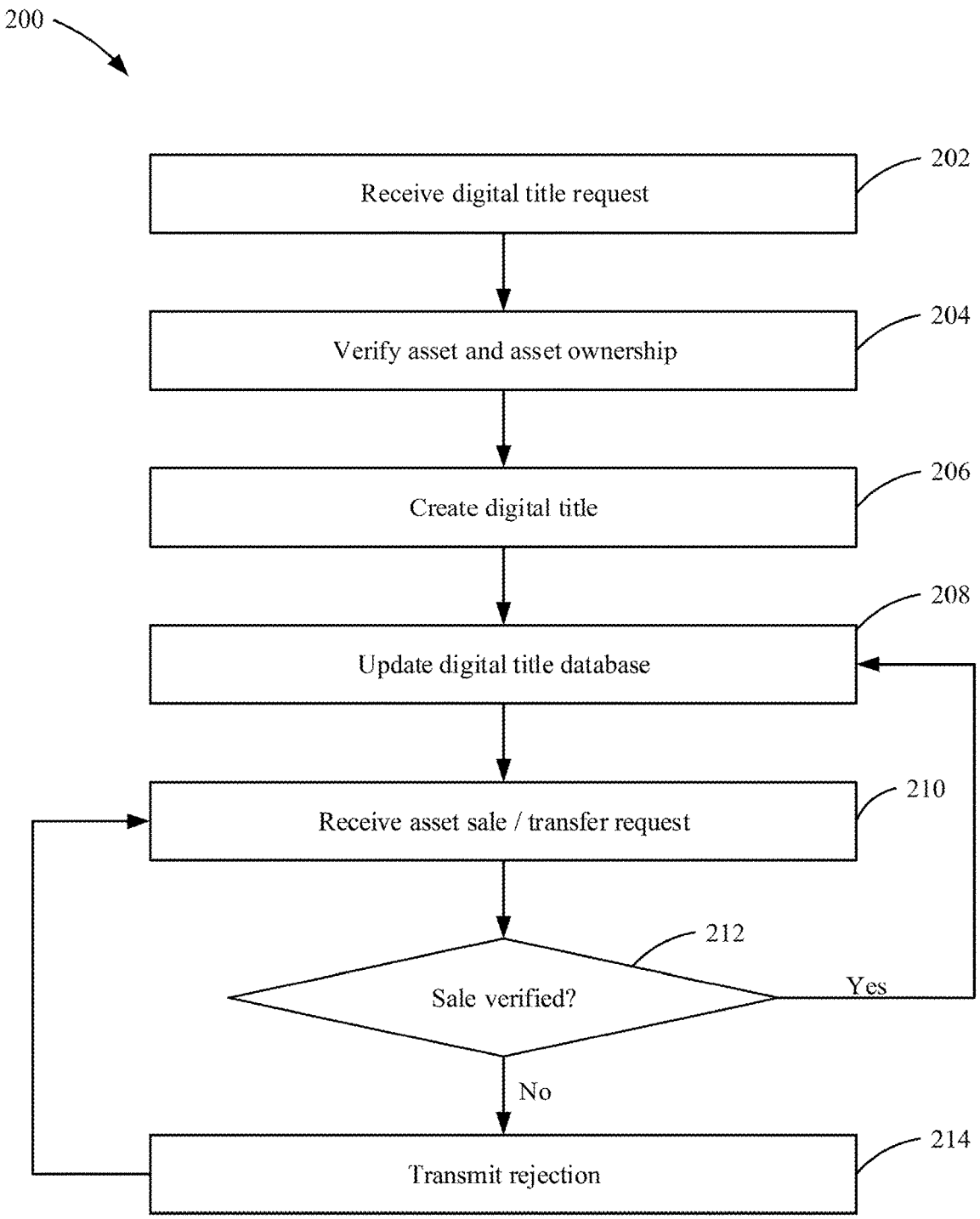
FIG. 2 is a flow diagram of a method of creating and maintaining digital title for a physical asset according to an example embodiment.

Referring to FIG. 2, a flow diagram of a method 200 of maintaining the digital title base 124 is shown according to an example embodiment. The method 200 is performed by a digital title company computing system associated with the digital title company 106. The digital title company computing system maintains the title database 124. The method 200 serves as a precursor to the method 300 (described below with respect to FIG. 3).

The method 200 begins when a digital title request is received at 202. The digital title request is received by the digital title company computing system from a title requestor (e.g., the owner of an asset). The digital title request includes information about the asset subject to the digital title request. The information may include, for example, a description of the asset, a serial number associated with the asset, a picture of the asset, any prior title information (e.g., proof of ownership, paper title documents, deeds, etc.) and the like.

Prior to creating a digital title for the asset, the asset and the asset ownership are verified at 204. The digital title company 106 verifies that the asset is the asset it purports to be. Additionally, the digital title company 106 verifies that the title requestor is the true owner of the asset. In some arrangements, step 204 is performed by the digital title company computing system (e.g., in the case of a digital asset). In other arrangements, step 204 may require physical inspection of the asset and the ownership papers by an agent of the digital title company 106. If the asset or the asset ownership cannot be verified, the digital title company 106 does not issue a digital title for the asset. For the sake of explanation, the description of the method 200 continues as if both the asset and the asset ownership were verified at 204.

After the asset and asset ownership are verified at 204, a digital title for the asset is created at 206. The digital title company computing system creates the digital title. The digital title is an entry in a database (e.g., the title database 124). The digital title includes a unique identifier for the asset, a description of the asset, and ownership information concerning the asset. Where appropriate, the description of the asset includes an image of the asset. In some arrangements, the digital title company computing system creates a unique token associated with the digital title. The unique token may be provided to the verified owner of the asset. In such arrangements, to pass ownership of the asset to another party, the owner can pass the token to the receiving party. In some arrangements, the token includes an encrypted string of digits that is signed by a private key associated with the owner of the asset such that the ownership can only be passed by the owner. The digital title database 124 is updated at 208. The digital title company computing system updates the digital title database 124 with the digital title for the asset. Steps 202 through 208 are repeated for each digital title request associated with verified assets having verified ownership.

An asset sale or transfer request is received at 210. The asset sale or transfer request is received by the digital title company 106. The request is received from either the current asset owner or the potential asset owner. The digital title company 106 verifies the sale or transfer from the current asset owner to the potential asset owner at 212 (e.g., by performing an investigation, by receiving authenticated/notarized sale information from the seller, etc.). If the sale or transfer is verified, the method 200 returns to 208, where the digital title database is updated. If the sale or transfer is not verified, a rejection is transmitted at 214. The rejection is transmitted by the digital title company computing system to the requestor. In some arrangements, where the requestor is not the asset owner, the rejection is also transmitted to the asset owner to alert the asset owner of the potential fraudulent transfer.

Figure 3:
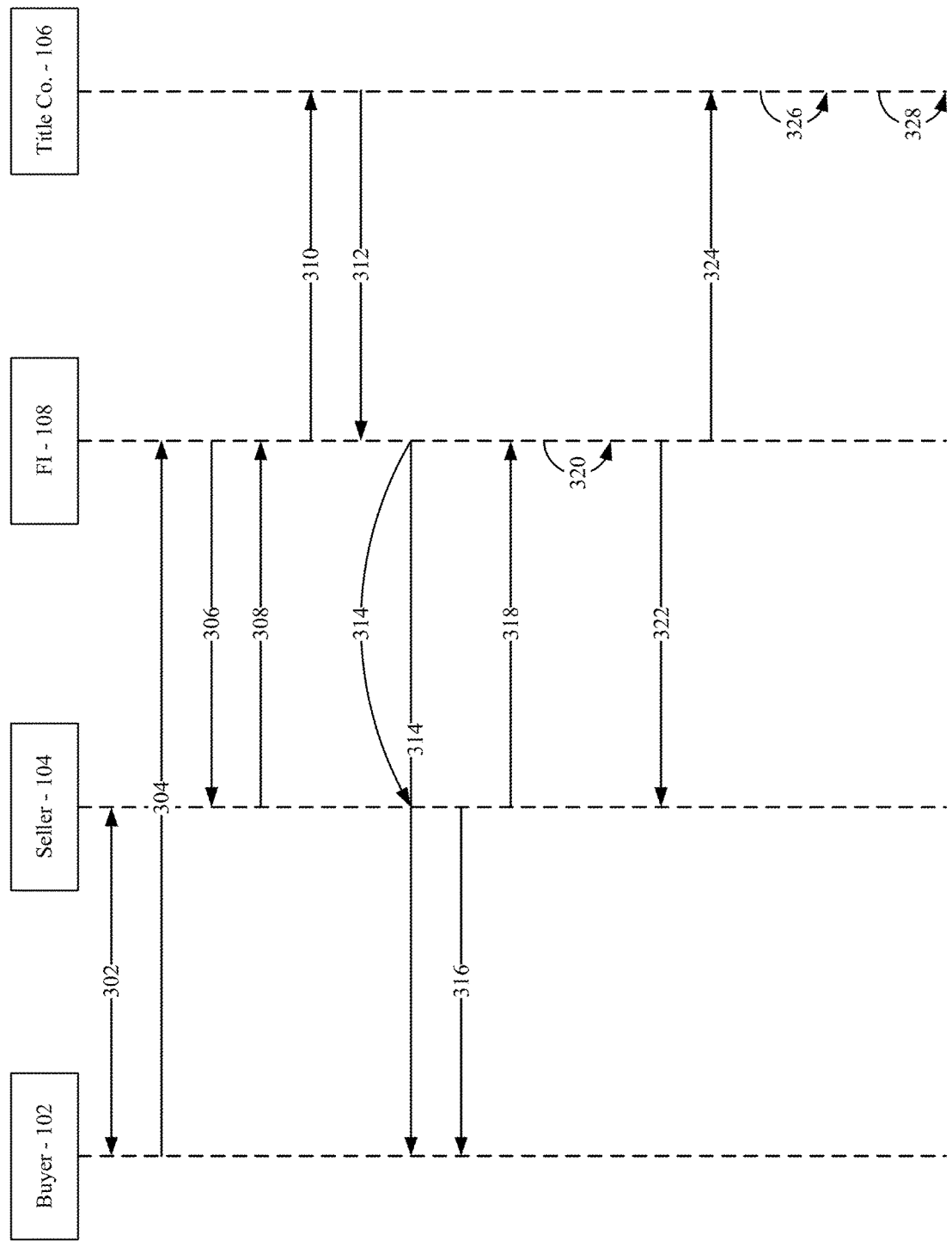
FIG. 3 is a flow diagram of a method of performing an escrowed transaction for a digitally titled asset according to an example embodiment.

Referring to FIG. 3, a flow diagram of a method 300 of performing an escrowed transaction for a digitally titled asset is shown. In the method 300, an asset is being transferred from the seller 104 to the buyer 102 (the "transaction"). The method 300 occurs after the asset is digitally titled by the digital title company 106 (e.g., as described above with respect to the method 200). In the method 300, seller 104 transfers digital title of the asset to the buyer 102 through a MBC transfer. In exchange, the buyer 102 pays the seller 104. In the arrangement of method 300, the buyer 102 pays the seller 104 in MBC through the financial institution 108, which acts as an escrow agent to the transaction described by method 300. Accordingly, as described in the method 300, the financial institution 108 holds the MBC used to purchase the asset while the asset's title is guaranteed and officially transferred.

The method 300 begins when the buyer and the seller negotiate a contract for the buyer to purchase the asset from the seller at 302. The seller 104 has rightful possession of the asset as certified by the digital title maintained by the digital title company 106. The seller 104 negotiates with the buyer 102 to sell the asset for an agreed upon amount of money. As described with respect to the method 300, the buyer 102 agrees to pay the seller 104 an agreed upon amount of MBC. However, it should be understood that the method 300 may be modified such that the buyer 102 agrees to pay the seller 104 an agreed upon amount of fiat currency, in services, or in exchange for another item (e.g., in a trade). The agreement is for an escrow transaction in which the financial institution 108 agrees to hold and verify the MBC from the buyer 102 until (1) the asset's ownership and digital title are verified, and (2) any other terms of the escrow agreement are satisfied. Once both conditions are satisfied, two MBC transactions are initiated. A first MBC transaction is initiated that passes digital title from the seller 104 to the buyer 102. A second MBC transaction is then initiated in which the seller 104 is paid for the asset. For example, the financial institution 108 initiates a second MBC transaction to the seller 104 for the purchase price (less any escrow fees).

The buyer 102 deposits the agreed upon amount of MBC with the financial institution 108 at 304. The buyer 102 initiates a transaction for the transfer of the MBC to the financial institution 108 via a MBC wallet application on a buyer computing device. The transaction is broadcast to the MBC verification nodes 120, where the transaction is verified and written to the MBC blockchain 122 (e.g., as described above with respect to the sample MBC transaction). In some arrangements, the buyer 102 is a MBC account holder with the financial institution 108. In such arrangements, the financial institution computing system 110 freezes the agreed upon amount of MBC held in an account associated with the buyer 102 (e.g., by freezing the funds on the overlay ledger 118). Additionally, at this time, the buyer 102 and/or the seller 104 provides a copy of the executed purchase or transfer contract to the financial institution 108. A copy of the contract may also be provided to the digital title company 106.

The financial institution 108 confirms that it has received the amount of MBC associated with the transaction at 306. The financial institution computing system 110 sends a first notification to the buyer computing device associated with the buyer 102 indicating that it has received the amount of MBC. The financial institution computing system 110 sends a second notification to a seller computing device associated with the seller 104 indicating that it has received the amount of MBC. In some arrangements, the second notification includes instructions to the seller 104 on how to provide the financial institution 108 with proof of asset ownership and how to transfer digital title to the asset to the buyer 102. The first and second notifications may be any of e-mail notifications, application push messages, or the like.

In response to the funds received message at 306, the seller 104 provides the financial institution 108 with proof of asset ownership at 308. In some arrangements, the seller 104 provides the financial institution 108 with a pointer to the digital title in the title database 124. For example, the pointer may be a hyperlink that directs a representative of the financial institution to the digital title within the title database 124. In other arrangements, the seller 104 provides the financial institution with a cryptogram or token that can be verified by the digital title company 106 to prove ownership of the asset. The financial institution 108 uses the proof of asset ownership to verify that the seller 104 has proper title to the asset being transferred to the buyer 102.

Based on the provided asset ownership information, the financial institution 108 requests ownership verification from the digital title company 106 at 310. The financial institution computing system 110 sends a verification request to the title company computing system. The verification request includes an identity of the seller 104 and the token provided by the seller 104 to the financial institution at 308. In response to the verification request, the title company computing system transmits a verification decision to the financial institution computing system 110. In some situations, the digital title company 106 cannot verify the ownership of the asset. In such situations, the digital title company 106 returns a negative verification decision to the financial institution 108. If a negative verification decision is returned, the financial institution 108 ends the escrow transaction, returns the MBC held to the buyer 102, and method 300 ends. In other situations, the digital title company 106 verifies the ownership of the asset. In such situations, the digital title company 106 returns a positive verification decision to the financial institution 108 at 312, and the method 300 continues.

After the financial institution 108 receives the positive verification decision at 312, the financial institution 108 confirms asset ownership to the buyer 102 and the seller 104 at 314. The financial institution computing system 110 transmits an ownership confirmation message to the buyer computing device. The ownership confirmation message includes an identification of the asset, a confirmation that the seller 104 owns the asset, and a transaction identifier. Additionally, the financial institution computing system 110 also transmits the ownership confirmation message to the seller computing device. The ownership confirmation message transmitted to the seller computing device may also include instructions to transfer the asset to the buyer 102. After the financial institution 108 confirms that the seller 104 owns the asset at 314, the escrow transaction is ready for execution.

The seller 104 sends digital title to the buyer 102 at 316. The seller 104 initiates a first MBC transfer from the seller 104 to the buyer 102. The first MBC transfer is for a nominal amount of MBC (e.g., 0.001 Bitcoin). A nominal amount of MBC refers to an amount of MBC that is large enough to be verified by the MBC verification nodes 120 such that it is written in the MBC blockchain 122. For example, if the MBC is Bitcoin, a nominal amount of Bitcoin may correspond to between 0.0001 BTC and 0.01 BTC. When the seller 104 initiates the first MBC transfer, the seller 104 either attaches the digital title to the first MBC transfer or attaches a pointer to the digital title to the first MBC transfer. For example, the seller 104 attaches the digital title to a metadata field of the first MBC transfer. In some arrangements, the seller 104 inserts the token associated with the digital title stored in the title database 124 into the op_return field, the nSequence field, or another metadata field of the first MBC transfer. Accordingly, when the first MBC transfer is verified by the verification nodes 120 and written in the MBC blockchain 122, the transfer of the digital title from the seller 104 to the buyer 102 is also written in the MBC blockchain 122. In an alternative arrangement, the digital title is transferred from the seller 104 to the buyer 102 in two separate transactions that form the first MBC transfer. In such an arrangement, the digital title is first transferred from the seller 104 to the financial institution 108 in a first MBC transfer in which the seller 104 attaches the digital title. Then, the digital title is transferred from the financial institution 108 to the buyer 102 in a second MBC transfer in which the financial institution 108 attaches the digital title. In conjunction with the first MBC transfer, the seller 104 also arranges for transfer of physical possession of the asset to the buyer 102 where necessary.

The seller 104 informs the financial institution 108 of the first MBC transfer at 318. The seller 104 provides the financial institution 108 a MBC transaction identifier such that the financial institution 108 can locate the first MBC transfer in the MBC blockchain 122. In some arrangements, the financial institution computing system 110 receives a message from the seller computing device with the transaction identifier. In arrangements where the first MBC transfer occurs in two separate transfers (a first from the seller 104 to the financial institution 108, and a second from the financial institution 108 to the buyer 102), step 318 is skipped.

The financial institution 108 confirms that the digital title was transferred from the seller 104 to the buyer 102 at 320. The financial institution computing system 110 cross-checks the transaction identifier received from the seller computing device at 318 with the MBC blockchain 122 to locate the first MBC transfer. In some situations, the provided transaction identifier does not match a MBC transaction in the MBC blockchain 122. In some situations, the lack of a matching MBC transaction indicates a potential fraudulent transaction. Accordingly, the financial institution 108 ends the escrow transaction, returns the MBC held to the buyer 102, and method 300 ends. In some arrangements, the financial institution computing system 110 sends a title transfer confirmation request to the digital title company computing system as an inquiry to verify that the digital title was transferred form the seller 104 to the buyer 102. The inquiry may include the transaction identifier of the MBC transaction that transfers digital title to the buyer 102. In such arrangements, the financial institution computing system 110 receives a response message from the digital title company computing system that either indicates a confirmed transfer of title or no transfer of title. The description of the method 300 proceeds as if the digital title transfer was confirmed.

After confirming that the digital title transferred from the seller 104 to the buyer 102, the financial institution 108 initiates a second MBC transfer from the financial institution 108 to the seller 104 at 322. The financial institution computing system 110 initiates the second MBC transfer to the seller 104 for the agreed upon purchase price by broadcasting the second MBC transfer to the MBC verification nodes 120. In some arrangements, the financial institution 108 retains a portion of the agreed upon purchase price as a fee for serving as the escrow agent to the transaction.

The financial institution 108 notifies the digital title company 106 of the asset transfer at 324. After completion of the first and second MBC transfers, the financial institution computing system 110 sends a title transfer notification to the digital title company computing system. The title transfer notification includes a transaction identifier associated with the first MBC transfer such that the digital title company 106 can identify the first MBC transfer in the MBC blockchain 122. The digital title company 106 verifies the asset's title transfer at 326. The digital title company computing system scans the MBC blockchain 122 to identify the first MBC transfer and to verify that digital title was passed from the seller 104 to the buyer 102 via the metadata of the first MBC transaction. As noted above with respect to 320, in some arrangements, the digital title company 106 informs the financial institution 108 that the title was successfully transferred in response to the inquiry. In such arrangements, 324 and 326 are skipped.

The digital title company 106 updates the title database 124 to reflect the new ownership of the asset at 328. The digital title company computing system updates the title database 124 to reflect that the buyer 102 now owns the asset. In some arrangements, the digital title company 106 issues a new digital title (e.g., a new token or certificate) and provides the new digital title to the buyer 102.

The above-described systems and methods provide for digital title transfers for sales of assets completed in MBC transactions. Although described within the confines of an escrow transaction, the same principles can be applied to non-escrow transactions. For example, any seller of a digitally titled asset can transfer the digital title by inserting the digital title (e.g., a token, a cryptogram, a pointer to the digital title, etc.) in the metadata of a MBC transaction. The above-described systems and methods provide for expedited transfers of assets between parties. Additionally, the above-described systems and methods provide for easily searchable ownership and verifiable chain of ownership via the MBC blockchain 122 and/or the title database 124 of the digital title company 106.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of verifying a token for an asset, the method comprising:
   receiving, by a digital title computing system, a digital title request regarding an asset;
   creating, by the digital title computing system, a token of a digital title for the asset, the token comprising proof of ownership of the asset, an identifier of the asset, a description of the asset, an identity of an owner of the asset, and prior title information, wherein creating the token further comprises signing the token with a private key;
   embedding, by the digital title computing system, the token into a metadata field of the math-based currency (MBC) transaction, wherein the metadata field stores additional information of the MBC transaction;
   tracking, by an overlay ledger, an amount of MBC associated with each customer in the math-based currency transaction, wherein the MBC is a cryptocurrency, and wherein the overlay ledger associates an individual customer with a designated amount of MBC;
   receiving, by the digital title computing system, an asset transfer request regarding the token;
   verifying, by the digital title computing system via a plurality of MBC verification nodes, the signature of the token;
   publishing, by the digital title computing system, verification information on a MBC blockchain;
   responsive to the verifying the signature of the token, transmitting, by the digital title computing system, a positive title verification; and
   updating, by the digital title computing system, the owner of the token for the asset.

2. The method of claim 1, wherein a pointer in the metadata field of a record of the math-based currency transaction on a distributed ledger comprises a location of the token in the digital title database.

3. The method of claim 2, wherein the metadata field is an op_return field associated with the MBC transaction.

4. The method of claim 2, wherein the metadata field is an nSequence field associated with the MBC transaction.

5. The method of claim 2, wherein the pointer is a hyperlink.

6. The method of claim 1, wherein the digital title further comprises an image or picture of the asset, and wherein the MBC of the MBC transaction is Bitcoin, and wherein the amount is between 0.0001 Bitcoin and 0.01 Bitcoin.

7. The method of claim 1, further comprising:
   providing, to a computing device of the owner of the token and by the digital title computing system, the token;
   maintaining, by the digital title computing system, a pooled MBC account database of addresses, private keys, and public keys associated with MBC, wherein the MBC has been transferred to a provider computing system; and
   transferring, by the digital title computing system, an agreed upon amount of MBC from a buyer to a seller in the MBC transaction, wherein a nominal amount of MBC that is large enough to be verified by the MBC verification nodes is sent before the agreed upon amount of MBC.

8. The method of claim 7, wherein the provider computer system maintains a plurality of pooled MBC accounts containing the MBC of a plurality of customers.

9. The method of claim 7, wherein the provider retains a portion of the agreed upon amount of MBC.

10. The method of claim 1, further comprising:
    responsive to a negative verification that an identity of a seller in the MBC transaction does not match the identity of the owner of the asset, transmitting, to a provider computing system, a negative title verification.

11. The method of claim 10, further comprising:
    transmitting, to a computing device of the owner of the token, the negative title verification to notify the owner of the token of a potential fraudulent transaction.

12. A system associated with a digital title company, system comprising:
    a network interface configured to communicate with customer devices associated with customers via a network;
    a digital title database storing digital titles relating to a plurality of assets maintained by a provider;
    a memory; and
    at least one processing circuit to:
      receive a digital title request regarding an asset;
      create a token of a digital title for the asset, the token comprising proof of ownership of the asset, an identifier of the asset, a description of the asset, an identity of an owner of the asset, and prior title information, wherein creating the token further comprises signing the token with a private key;
      embed the token into a metadata field of the math-based currency (MBC) transaction, wherein the metadata field stores additional information of the MBC transaction;
      track an amount of MBC associated with each customer in the math-based currency transaction, wherein the MBC is a cryptocurrency, and wherein the overlay ledger associates an individual customer with a designated amount of MBC;
      receive an asset transfer request regarding the token;
      verify, via a plurality of MBC verification nodes, the signature of the token;
      publish verification information on a MBC blockchain;
      responsive to the verifying the signature of the token, transmit a positive title verification; and
      update the owner of the token for the asset.

13. The system of claim 12, wherein a pointer in the metadata field of a record of the math-based currency transaction on a distributed ledger comprises a location of the token in the digital title database, wherein the pointer is a hyperlink.

14. The system of claim 13, wherein the metadata field is an op_return field associated with the MBC transaction.

15. The system of claim 13, wherein the metadata field is an nSequence field associated with the MBC transaction.

16. The system of claim 12, wherein the digital title further comprises an image or picture of the asset, and wherein the MBC of the MBC transaction is Bitcoin, and wherein the amount is between 0.0001 Bitcoin and 0.01 Bitcoin.

17. The system of claim 12, the at least one processing circuit further to:
   provide, to a computing device of the owner of the token, the token;
   maintain a pooled MBC account database of addresses, private keys, and public keys associated with MBC, wherein the MBC has been transferred to a provider computing system, and wherein the provider computer system maintains a plurality of pooled MBC accounts containing the MBC of a plurality of customers, and wherein the provider retains a portion of the agreed upon amount of MBC; and
   transfer an agreed upon amount of MBC from a buyer to a seller in the MBC transaction, wherein a nominal amount of MBC that is large enough to be verified by the MBC verification nodes is sent before the agreed upon amount of MBC.

18. The system of claim 12, the at least one processing circuit further to:
   responsive to a negative verification that an identity of a seller in the MBC transaction does not match the identity of the owner of the asset, transmit a negative title verification.

19. The system of claim 18, the at least one processing circuit further to:
   transmit, to a computing device of the owner of the token, the negative title verification to notify the owner of the token of a potential fraudulent transaction.

20. A non-transitory computer readable media having computer-executable instructions embodied therein that, when executed by one or more processing circuit, causes the one or more processing circuit to:
   receive a digital title request regarding an asset;
   create a token of a digital title for the asset, the token comprising proof of ownership of the asset, an identifier of the asset, a description of the asset, an identity of an owner of the asset, and prior title information, wherein creating the token further comprises signing the token with a private key;
   embed the token into a metadata field of the math-based currency (MBC) transaction, wherein the metadata field stores additional information of the MBC transaction;
   track an amount of MBC associated with each customer in the math-based currency transaction, wherein the MBC is a cryptocurrency, and wherein the overlay ledger associates an individual customer with a designated amount of MBC;
   receive an asset transfer request regarding the token;
   verify, via a plurality of MBC verification nodes, the signature of the token;
   publish verification information on a MBC blockchain;
   responsive to the verifying the signature of the token, transmit a positive title verification; and
   update the owner of the token for the asset.

* * * * *

UNITED STATES PATENT AND TRADEMARK OFFICE
CERTIFICATE OF CORRECTION

PATENT NO. : 11,847,621 B2  
APPLICATION NO. : 17/963980  
DATED : December 19, 2023  
INVENTOR(S) : Ashish B. Kurani Page 1 of 1

It is certified that error appears in the above-identified patent and that said Letters Patent is hereby corrected as shown below:

On the Title Page

Item (63), after Related U.S. Application Data:
"Continuation of application No. 16/960,582, filed on Jul.8, 2020 now Pat. No. 11,259,270" should be
--Continuation of application No. 16/930,582, filed on Jul 16, 2020, now Pat. No. 11,468,413--

Signed and Sealed this
Eighth Day of April, 2025

Coke Morgan Stewart
*Acting Director of the United States Patent and Trademark Office*